United States Patent [19]  [11] 4,309,323
Orloff et al.  [45] Jan. 5, 1982

[54] MELT DYEING OF POLYETHYLENE WITH INDIGO

[75] Inventors: Malcolm K. Orloff, Basking Ridge, N.J.; LeRoy A. White, Somers, Conn.

[73] Assignee: Buffalo Color Corporation, West Paterson, N.J.

[21] Appl. No.: 195,235

[22] Filed: Oct. 8, 1980

[51] Int. Cl.³ .............................................. C08L 91/06
[52] U.S. Cl. ............................ 260/28.5 A; 260/42.21
[58] Field of Search ............. 260/42.21, 28.5 A, 42.46

[56] References Cited
U.S. PATENT DOCUMENTS 3,767,444 10/1973 Zeisberger ...................... 260/42.21
4,235,641 11/1980 Engelmann et al. ............. 260/42.21

*Primary Examiner*—Lewis I. Jacobs
*Attorney, Agent, or Firm*—Michael L. Dunn

[57] ABSTRACT

A composition comprising polyethylene having from about 0.002 to about 1 weight percent of indigo dye uniformly melt dispersed therein. The average particle size of the dispersed indigo being less than about 1 micron. And the process for coloring polyethylene which comprises blending indigo into melted polyethylene at a concentration of from about 0.002 to about 1 percent by weight of polyethylene until a uniform dispersion is obtained.

14 Claims, No Drawings

MELT DYEING OF POLYETHYLENE WITH INDIGO

(A) FIELD OF THE INVENTION

This invention relates to colorants for polyethylene and more particularly relates to colorants for polyethylene which have high color strength, low bleed resistance, good light resistance and low cost. The invention is more particularly concerned with a composition comprising polyethylene colored with such a colorant and the process for making such a composition.

(B) HISTORY OF THE PRIOR ART

Dyes and pigments are available for polyethylene but unfortunately most such dyes and pigments, especially blue dyes and pigments, do not have a combination of light stability as high as desirable, bleed resistance as high as desirable and coloring power as high as desirable. Furthermore, such blue dyes or pigments which have the best of these properties are comparatively more difficult to manufacture, or are made with intermediates which are comparatively more difficult to manufacture which results in costs which are higher than desirable. Furthermore, many such prior art dyes and pigments required complicated processes to incorporate them into the polyethylene. Dyes especially are difficult to use in polyethylene due to poor bleed resistance. There is therefore little, if any, use of dyes in polyethylene and therefore the advantage of the lower coloring concentrations required by dyes is unavailable.

A well known vat dye in the prior art is indigo which has the chemical formula:

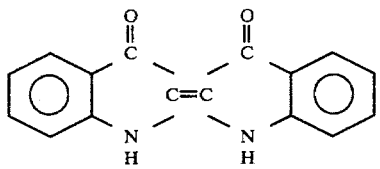

Although indigo may have been used to color polypropylene, as described in U.S. Pat. No. 3,767,444, there is no disclosure or suggestion in that patent of any particular advantage in using indigo to color polypropylene. Several patents generically describe dyeing fibers of polyolefins, including polyethylene, with various types of dyes including indigo types but not specifically indigo. These processes are not melt dyeing processes and the dyes do not become as uniformly distributed throughout the polyolefin as occurs in melt dyeing. There is no disclosure or suggestion of any particular advantage in using indigo itself to dye any polyolefin.

U.S. Pat. Nos. 3,923,452 and 3,969,302 describe a complex two phase process for coloring the surface of countless polymers including polyethylenes with countless dyes including ingoid dyestuffs such as indirubin, indigo and thioindigo derivatives. It is estimated that well over 10,000 possible combinations are included within the specific and generic description. There is no specific description of combining indigo with polyethylene and no suggestion that any particular advantage would result from such a combination. There is a description of melt spinning numerous specific polymers, other than polyethylene, which were dyed using the complex process described in the patents.

BRIEF DESCRIPTION OF THE INVENTION

In accordance with the present invention, it has been surprisingly discovered that when polyethylene is melt dyed with indigo that the resulting product has excellent bleed resistance and light fastness and in addition, low concentrations are required to obtain excellent depth of color. Desirably to maximize the uniformity of color and to obtain desirable characteristics of both dyes and pigments, i.e., the low concentrations required by dyes and the bleed resistance of pigments, the average particle size of the indigo in the polyethylene is less than 0.75 microns, preferably less than 0.5 microns and most preferably less than 0.2 microns. In general, the composition of the invention comprises polyethylene having from about 0.002 to about 1.0 weight percent of indigo dye uniformly dispersed therein. The process of the invention comprises blending indigo into melted polyethylene at the appropriate concentration until a uniform dispersion is obtained. The indigo may be in powder form desirably with a very small average particle size, e.g., less than 10 microns. The indigo blended into the polyethylene may be predispersed into a high molecular weight lipophylic medium. The processes of dispersion or predispersion seem to further reduce the particle size of the indigo. It has also been found that the indigo can be used in conjunction with other pigments to obtain a deep coloration at lower total pigment concentration than would otherwise be required.

DETAILED DESCRIPTION OF THE INVENTION

The polyethylene dyed in accordance with the present invention may be low, medium or high density polyethylene having a molecular weight of from about 10,000 to about 120,000. As is known in the art, polyethylene is an essentially linear thermoplastic polymer of ethylene polymerized under high pressure or catalytically. "Polyethylene", as used herein, is intended to include copolymers of ethylene with up to 5% of another hydrophobic vinyl monomer such as propylene, styrene, vinyl chloride or butene.

The indigo dye may be natural or synthetic since they are chemically essentially the same. Indigo, also known as indigotin or Vat Blue 1, as previously mentioned, has the structural formula:

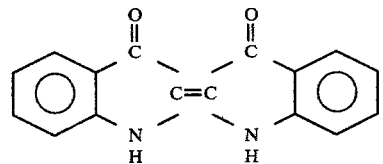

and has Color Index Number 73000. The indigo may be in either the cis or trans form.

Unmodified indigo, which is used in accordance with the present invention, is insoluble in water and almost all polar and non-polar solvents. In general, indigo must be chemically modified or treated to obtain a soluble form before it can be applied as a dye to a substrate such as cotton and then must be subsequently developed on the substrate to form the color.

In accordance with the process of the invention, the untreated indigo in predispersed or powder form is blended with the polyethylene. The polyethylene is at a temperature high enough to be sufficiently fluid to permit blending but at a temperature low enough to prevent excessive decomposition of the polyethylene or vaporization of the indigo. Appropriate temperatures are generally from about 150° C., at which many polyethylenes can be worked, to about 300° C. which is the sublimation temperature of indigo. As used herein, "melted", when referring to polyethylene, means that the polyethylene is sufficiently fluid to permit blending with a solid or compatible fluid substance.

In general, from about 0.002 to about 1.0 percent indigo by weight of polyethylene is blended into melted polyethylene until a uniform dispersion is obtained. The blending may be accomplished by any suitable means but is usually accomplished by a mixing apparatus such as a Banbury type mixer or a rubber mill. The concentration of indigo used depends upon the depth of color desired. Usually the concentration is from about 0.005 to about 0.1 percent indigo by weight of polyethylene in sheets or films having a thickness of 0.015 inches or greater.

The indigo may be blended into the polyethylene as indigo powder or predispersed into a lipophylic medium. When the indigo used is in powder form, it desirably has a very small average particle size, e.g., less than 10 microns, preferably less than 1 micron and most preferably less than 0.5 microns. Such small particle sizes are desirable whether the powder is dispersed directly into the polyethylene or predispersed as previously discussed.

It has been found that the particle size of the indigo powder may become even smaller than the starting particle during the dispersion process whether the indigo powder is dispersed directly into the polyethylene or predispersed. When the indigo is predispersed, essentially any lipophylic predispersing medium may be used provided that the medium is compatible with and does not adversely affect the desired end use properties of the polyethylene. High molecular weight lipophylic media are preferred in accordance with the invention since low molecular weight media increase the tendency of the indigo to bleed which is contrary to a primary advantage of this invention. By high molecular weight is meant a molecular weight of at least 1000. Examples of suitable predispersing media for use in accordance with the present invention are polyethylene wax, polypropylene wax, oxidized polyethylene, oxidized polypropylene and hard paraffin wax. Melted polypropylene or melted polyethylene may also be used as predispersing media. Such predispersions desirably contain from about 10 to about 50 percent indigo by combined weight of indigo and lipophylic medium in the predispersion.

In dispersing or predispersing indigo into the polyethylene, a surface active agent may be used to assist in obtaining the dispersions. Desirably as little surface active agent as possible and preferably no surface active agent is used since such agents generally increase bleeding of a dye or pigment.

Additional colorants in the form of dyes or pigments or other additives may be simultaneously dispersed into the polyethylene with the indigo or may otherwise be added to the polyethylene provided that such other colorants or additives do not interfere with the desired end use properties of the polyethylene. For example, in addition to the indigo, from about 0.01 to about 5 percent of an additional colorant, such as phthalo blue pigment, by weight of polyethylene, may be blended into the melted polyethylene. When such a blend is used, better color depth is obtained for the same weight percent colorant than when phthalo blue is used alone.

The finished polyethylene composition comprises from about 0.002 to about 1 weight percent of indigo dye uniformly dispersed therein. When the film or sheet thickness is 0.015 inches or thicker, usually less than 0.1 weight percent indigo is needed. The average particle size of the dispersed indigo is usually less than one micron, preferably less than 0.2 microns.

The use of indigo in melt dyeing of polyethylene surprisingly has advantages of both dyes and pigments yet the manufacture of indigo is less complex and made from more abundant and less costly intermediates than certain dyes and pigments used in the prior art to provide a blue color to polyethylene. In particular, polyethylene dyed with indigo in accordance with the present invention has the bleed resistance of polyethylene dyed with bleed resistant pigments yet coloring of the polyethylene with indigo requires concentrations which are low compared to most pigments, which is an advantage usually associated with dyes. Furthermore, the color resulting from melt dyeing of polyethylene with indigo is surprisingly stable to light.

The following examples serve to illustrate and not limit the process and composition of the present invention. Unless otherwise indicated, all parts and percentages are by weight.

EXAMPLE I

Buffalo Color Co. Indigo, 0.15 parts, was milled at about 165° C. into 100 parts of Phillips Petroleum Marlex ® EMN 6030 (high density, 0.96, polyethylene, melt index 30) and 0.1 parts of Ciba Geigy Irganox ® 1010 (phenolic antioxidant). The material was press molded to form a 0.02 inch thick sheet. As a control, 0.1 American Cyanamid Oil Blue N ® dye was milled under the same conditions into 100 parts of Marlex 6030 and 0.1 parts of Irganox 1010. This stock was also press-molded to 0.02 inch thickness.

The press-molded samples were labeled by affixing 3M brand Scotch ® Masking Tape and writing on the masking tape. After one year storage at room temperature, the Indigo-containing plaque was unaffected but the oil Blue-containing plaque had released considerable dye to the masking tape and was in fact lighter in color under the tape area. The 0.02 inch plaques were covered on one end with aluminum foil and mounted on a rotating table 5.5 inches below a General Electric ® RS-4 bulb (powerful ultraviolet source). The table was contained in a ventilated chamber maintained at 53° C. by means of a 200 watt incandescent bulb. After 2 days of exposure, the Oil Blue dye was slightly faded. After 7 days of exposure, the Oil Blue dye was badly faded, except where covered by aluminum foil. By contrast, the indigo-containing sample was unaffected at 44 days, when the test was terminated. The polyethylene itself was embrittled by the U.V. exposure. Thus the indigo in polyethylene is closer to being a pigment in bleed resistance and light resistance, in effect, than to the dye.

EXAMPLE II

Buffalo Color Indigo, 40 parts, was milled into Allied Chemical AC-629 oxidized polyethylene wax, 60 parts, using a three roll paint mill with rolls heated to 100° C. This procedure yielded a very fine dispersion of indigo in the wax. A similar procedure was carried out using 40 parts of Kohnstamm Phthalocyanine Blue 505 pigment in 60 parts AC-629.

A 5% masterbatch of Phthalo Blue in Phillips Petroleum Marlex EMN6030 polyethylene was prepared by milling the AC-629 dispersion at 145° C. into Marlex Polyethylene EMN6030. Similarly, a 1% indigo dispersion was prepared in Marlex EMN6030 polyethylene.

These masterbatches were then further milled into additional EMN6030 polyethylene to achieve various levels of indigo or Phthalo Blue. Plaques were molded 0.015 in. and ⅛ in. thick and depth of color comparisons were made. The particle size of the indigo in the plaques is determined to be about 0.5 microns or less. The results of the color are shown in Tables I and II.

TABLE I

Equivalent Depth of Color, Indigo vs Phthalo Blue
0.015 Inch Polyethylene Plaques

| Indigo (%) | Matching % Phthalo Blue Color Depth | Required Weight Phthalo Blue/ Indigo |
| --- | --- | --- |
| 0.007 | 0.01 | 1.4/1 |
| 0.015 | 0.025 | 1.7/1 |
| 0.033 | 0.05 | 1.7/1 |
| 0.045 | 0.1 | 2.2/1 |
| 0.05 | 0.2 | 4/1 |
| 0.06 | 0.3 | 5/1 |
| 0.1 | 0.5 | 5/1 |
| 0.2 | 1 | 5/1 |

TABLE II

Equivalent Depth of Color, Indigo vs Phthalo Blue
0.125 Inch Plaques

| Indigo (%) | Matching % Phthalo Blue Color Depth | Required Weight Phthalo Blue/ Indigo |
| --- | --- | --- |
| 0.005 | 0.01 | 2/1 |
| 0.01 | 0.025 | 2.5/1 |
| 0.015 | 0.05 | 3.3/1 |
| 0.02 | 0.1 | 5/1 |
| 0.03 | 0.2 | 6.7/1 |
| 0.04 | 0.3 | 7.5/1 |
| 0.05 | 0.5 | 10/1 |
| 0.07 | 1 | 14.3/1 |

The foregoing Example II clearly demonstrates that much less indigo is required than the commonly used Phthalo Blue pigment to obtain equivalent color depth. Thicker plaques require less indigo than thinner plaques to obtain equivalent color depth.

EXAMPLE III

A 0.015 inch thick plaque containing both 0.01% Phthalo Blue and 0.01% Indigo prepared substantially in accordance with the method of Example II, appeared to be equivalent, or even deeper in color depth, versus a 0.025% Phthalo Blue plaque. The two colorants therefore seem to act synergistically. Thus Indigo can be utilized as a partial substitute for a pigment.

EXAMPLE IV

The 40% indigo dispersion in Allied Chemical AC-629 wax (prepared as in Example II) was mill-compounded into Marlex EMN6030 polyethylene to achieve a 1% indigo, 99% polyethylene stock. This stock was compression molded to a thickness of 0.020 inch. A 6-inch disc of this material was heated (infared) and stretched down to a thickness of 0.002 inch. A dark blue film was thus obtained.

The stock was also readily extrudable into fiber form. A blue fiber was obtained.

What is claimed is:

1. A composition comprising polyethylene having from about 0.002 to about 1 weight percent of indigo dye uniformly melt dispersed therein, the average particle size of said dispersed indigo being less than about 1 micron.

2. The composition of claim 1 wherein from about 0.005 to about 0.1 weight percent indigo is dispersed into the polyethylene.

3. The composition of claim 1 wherein the average particle size is less than 0.5 microns.

4. The composition of claim 3 wherein the average particle size is less than 0.2 microns.

5. The composition of claim 1 wherein the polyethylene additionally contains from about 0.01 to about 5 weight percent of an additional colorant uniformly dispersed therein.

6. A process for coloring polyethylene which comprises blending indigo into melted polyethylene at a concentration of from about 0.002 to about 1 percent by weight of melted polyethylene until a uniform dispersion is obtained.

7. The process of claim 6 wherein indigo powder is blended directly with the polyethylene.

8. The process of claim 7 wherein the average particle size of the powder is less than 10 microns.

9. The process of claim 8 wherein the average particle size of the powder is less than one micron.

10. The process of claim 9 wherein the average particle size of the powder is less than 0.5 micron.

11. The process of claim 6 wherein in addition to indigo, from about 0.01 to about 5 percent an additional colorant by weight of polyethylene is blended into the melted polyethylene.

12. The process of claim 6 wherein prior to blending with the polyethylene, the indigo is predispersed into a liquid high molecular weight lipophylic medium selected from the group consisting of polyethylene wax, polypropylene wax, oxidized polyethylene, oxidized polypropylene and hard paraffin wax.

13. The process of claim 11 wherein the lipophylic medium is oxidized polyethylene.

14. The process of claim 12 wherein from about 10 to about 50 percent indigo is predispersed into the liquid lipophylic medium by combined weight of the medium and indigo.

* * * * *